US008532014B2

(12) United States Patent
Xu et al.

(10) Patent No.: US 8,532,014 B2
(45) Date of Patent: Sep. 10, 2013

(54) RELAY DEVICE AND METHOD CAUSING A SWITCHING DESTINATION TERMINAL TO PERFORM A SMOOTH DATA OUTPUT CORRESPONDING TO A PROCESSING CAPACITY OF THE SWITCHING DESTINATION TERMINAL AT THE TIME OF SWITCHING BETWEEN TERMINALS

(75) Inventors: Ming qiang Xu, Osaka (JP); Daisaku Komiya, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1070 days.

(21) Appl. No.: 12/377,509

(22) PCT Filed: Aug. 14, 2007

(86) PCT No.: PCT/JP2007/065845
§ 371 (c)(1),
(2), (4) Date: Feb. 13, 2009

(87) PCT Pub. No.: WO2008/023606
PCT Pub. Date: Feb. 28, 2008

(65) Prior Publication Data
US 2010/0232343 A1  Sep. 16, 2010

(30) Foreign Application Priority Data

Aug. 23, 2006 (JP) ................................ 2006-226331

(51) Int. Cl.
*H04W 40/00* (2009.01)
(52) U.S. Cl.
USPC ........................ 370/315; 370/310; 375/240.02
(58) Field of Classification Search
USPC .............................. 370/310, 315; 375/240.02
See application file for complete search history.

(56) References Cited

U.S. PATENT DOCUMENTS 7,590,064 B1 * 9/2009 Zhang et al. .................. 370/235

7,933,456 B2 * 4/2011 Han et al. ...................... 382/233

FOREIGN PATENT DOCUMENTS

| JP | 07-273791 | 10/1995 |
| JP | 8-237329 | 9/1996 |

(Continued)

OTHER PUBLICATIONS

Japanese Office Action issued Apr. 12, 2011 in Japanese Application No. 2006-226331.

(Continued)

*Primary Examiner* — Andrew Lai
*Assistant Examiner* — Siming Liu
(74) *Attorney, Agent, or Firm* — Wenderoth, Lind & Ponack, L.L.P.

(57) ABSTRACT

A relay device (40) comprises: an NW interface (408) for making a connection with a switching source terminal (20) that is receiving media data transmitted from a media server (10) and with a switching destination terminal (30); an information storage (403) for storing a media data processing capacity of the switching source terminal (20) and switching destination terminal (30); a media controller (401) for making a transmission request to the media server (10) for media data corresponding to the above processing capacity in the information storage (403), and for acquiring the above processing capacity of the switching destination terminal (30) from the information storage (403) and instructing to transfer the media data corresponding to the acquired processing capacity to the switching destination terminal (30); a media receiver (404) for receiving the media data transmitted from the media server (10); a media buffer (405) for holding the media data; and a media transmitter (406) for acquiring from the media buffer (405) the media data corresponding to the processing capacity of the switching destination terminal (30) and transferring it to the switching destination terminal (30).

6 Claims, 11 Drawing Sheets

(56) References Cited

FOREIGN PATENT DOCUMENTS

| | | | |
|---|---|---|---|
| JP | 2001-249868 | | 9/2001 |
| JP | 2003-513541 | | 4/2003 |
| JP | 2004-248165 | | 9/2004 |
| JP | 2004248165 A | * | 9/2004 |
| JP | 2004-336310 | | 11/2004 |
| JP | 2006-127220 | | 5/2006 |
| JP | 2006127220 A | * | 5/2006 |
| WO | 01/33781 | | 5/2001 |

OTHER PUBLICATIONS

H. Mineno et al., "A Study on I/O Device Control within mPAN for Home Network Environment", Jul. 6, 2005 (along with the partial English translation).

International Search Report issued Sep. 11, 2007 in the International (PCT) Application No. PCT/JP2007/065845.

International Preliminary Report on Patentability issued Mar. 5, 2009 in the International (PCT) Application No. PCT/JP2007/065845.

* cited by examiner

| DEVICE | RESOLUTION | LEVEL |
|---|---|---|
| MOBILE TELEPHONE | 352 × 288 | LOW |
| TV | ⋮ | HIGH |
| ⋮ | | ⋮ |

3011, 3012, 3013

103 — FGS+ (multiplexed)
102 — FGS
101 — MPEG-4

I-VOP (104)  FGST (105)  P-VOP (106)

FIG. 9

| LEVEL<br>QUALITY | LOW | MEDIUM | HIGH |
|---|---|---|---|
| FRAME RATE | I-VOP | I-VOP/P-VOP | I-VOP/P-VOP/FGST |
| RESOLUTION | BASE LAYER | BASE LAYER /FSG | BASE LAYER /FGS/FGS+ |
| IMAGE QUALITY (S/N) | BASE LAYER<br>/FGS:1ST LAYER<br>/FGS+:1ST LAYER | BASE LAYER<br>/FGS: 1ST AND 2ND LAYERS<br>/FGS+:1ST AND 2ND LAYERS | BASE LAYER<br>/FGS:1ST TO 3RD LAYERS<br>/FGS+:1ST TO 3RD LAYERS |

RELAY DEVICE AND METHOD CAUSING A SWITCHING DESTINATION TERMINAL TO PERFORM A SMOOTH DATA OUTPUT CORRESPONDING TO A PROCESSING CAPACITY OF THE SWITCHING DESTINATION TERMINAL AT THE TIME OF SWITCHING BETWEEN TERMINALS

TECHNICAL FIELD

The present invention relates to relay devices, and particularly to a relay device that switches a relay destination.

BACKGROUND ART

In recent years, there have been further developments in ubiquitous network environments that are accessible whenever and wherever. Specifically, getting popular are broadband networks including optical fibers and wireless networks including ad-hoc networks. Information appliances and other network-connectable devices are also getting popular.

Under these circumstances, there have been suggested the following three techniques as important techniques for ubiquitous networks. Namely, the three techniques are Network Seamless (also called Terminal Mobility), Device Seamless (also called Session Mobility), and Content Seamless (also called Media Adaptive).

Network Seamless is a technique for seamlessly switching a network to be accessed when a terminal moves between different networks. Device Seamless is a technique for seamlessly switching services and sessions between different terminals. Content Seamless is a technique for seamlessly switching to different media (including different formats and different media parameters).

Conventional techniques related to Session Mobility and Content Seamless will be described with reference to drawings.

Described first will be a technique related to Session Mobility accompanied by Content Seamless (for example, see IETF Internet-Draft "Session Initiation Protocol (SIP) Session Mobility" draft-shacham-sipping-session-mobility-01.txt, which is hereinafter referred to as the "IETF Internet-Draft").

FIG. 1 illustrates conventional Session Mobility accompanied by Content Seamless. In FIG. 1, a switching source terminal 500 is receiving data related to an image delivery service from a media server 502. Then, using a SIP (Session Initiation Protocol) REFER 505 for example, the switching source terminal 500 instructs a switching destination terminal 501 to switch.

Upon receiving the switching instruction from the switching source terminal 500, the switching destination terminal 501 establishes a session with the media server 502 using, for example, a SIP INVITE 504. Specified in the Body of the SIP INVITE 504 is image resolution that can be handled by the switching destination terminal 501.

Upon receiving the SIP INVITE 504 from the switching destination terminal 501, the media server 502 establishes a session with the switching destination terminal 501. The session established here is a session in which the resolution specified in the Body of the SIP INVITE 504 is set.

The media server 502 transmits data related to the image delivery service, the data having the resolution specified in the Body of the SIP INVITE 504, to the switching destination terminal 501. The media server 502 then disconnects the session with the switching source terminal 500 using, for example, a SIP BYE 503. In this way, changing image resolution of image data in accordance with the capacity of the switching destination terminal 501, the media server 502 switches the session from the switching source terminal 500 to the switching destination terminal 501.

Described next will be a technique related to Session Mobility using a relay server, with a media relay method described in Japanese Patent Laid-Open Application No. 2004-248165 as an example.

FIG. 2 illustrates conventional Session Mobility using a relay server. The system shown in FIG. 2 has a communication terminal 600, a switching source terminal 601, a switching destination terminal 602, and a relay device 603. The relay device (relay server) 603 switches the connection from the connection between the communications terminal 600 and the switching source terminal 601 to the connection between the communications terminal 600 and the switching destination terminal 602. The relay device 603 then transfers media data (e.g. image data) delivered from the communication terminal 600 to the switching destination terminal 602. This procedure is shown in FIG. 3.

As shown in FIG. 3, the relay device 603 receives media data from the communication terminal 600 (S600), and transfers the media data to the switching source terminal 601 (S601).

The switching source terminal 601 then instructs the relay device 603 to perform session switching that switches a session of a currently used service (S602). Information on a session identifier and on an identifier of the switching destination terminal 602, for example, is notified as the session switching instruction.

The relay device 603 then transmits the media data received from the communication terminal 600 to the switching destination terminal 602 that is indicated by the session switching instruction as a switching destination terminal (S603).

DISCLOSURE OF THE INVENTION

Problems to be Solved by the Invention

However, the switching destination terminal 501 described in the IETF Internet-Draft receives moving image data having specified resolution from the media server 502, but temporarily buffers the data in a data receiving buffer of the switching destination terminal 501 and then outputs the data. This tends to cause data output delay.

Also in the media relay method described in Japanese Patent Laid-Open Application No. 2004-248165, session switching is performed but media data transferred from a relay device is temporarily buffered in a data receiving buffer of a switching destination terminal, and the data is outputted afterward. This tends to cause data output delay.

Particularly, the output delay occurs obviously in image streaming.

Therefore, the invention made in view of the above circumstances provides a relay device that causes a switching destination terminal to perform a smooth data output corresponding to a processing capacity of the switching destination terminal at the time of switching between terminals.

Means for Solving the Problems

In order to solve the above-mentioned problems, a relay device of the invention comprises: a communication unit operable to make a connection with a receiving terminal that is receiving, not via the relay device, media data transmitted from a data delivery apparatus; a data storage for storing information indicating a media data processing capacity of the receiving terminal and another communications terminal different from the receiving terminal; a controller for making a transmission request to the data delivery apparatus for media data corresponding to information stored in the data storage and indicating a processing capacity; a receiver for receiving the media data transmitted from the data delivery apparatus; a buffer for holding the media data received by the receiver; a signaling unit operable to accept a terminal switching instruction from the receiving terminal; and a transfer unit operable to transfer to the other communications terminal the media data held in the buffer and corresponding to a processing capacity of the other communications terminal, after the instruction is accepted.

There are other aspects of the invention as described below. This disclosure of the invention therefore intends to provide part of the invention and does not intend to limit the scope of the invention described and claimed herein.

BRIEF DESCRIPTION OF THE DRAWINGS

FIG. 9 shows an example of data to be transmitted in accordance with quality levels.

BEST MODE OF EMBODYING THE INVENTION

The following is a detailed description of the invention. It will be understood that the embodiments described below are only examples of the invention, and the invention can be varied in various aspects. Therefore, the specific configurations and functions disclosed below do not limit the claims.

Now, embodiments of the invention will be described with reference to the drawings.
(First Embodiment)
FIG. 4 shows an example of the whole system configuration including a relay device of a first embodiment.

Figure 1:
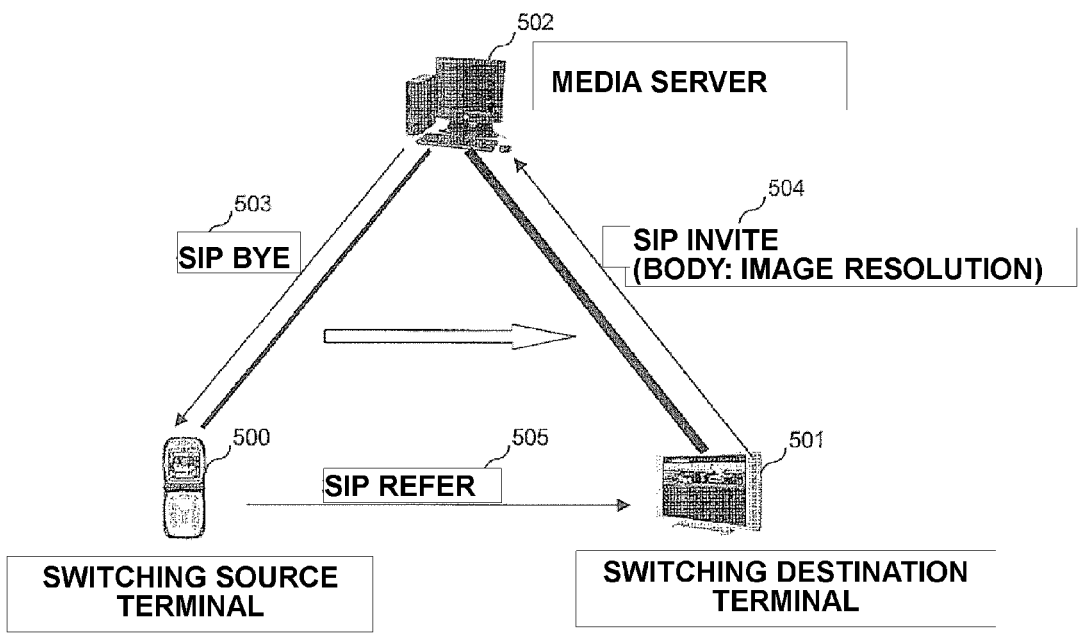
FIG. 1 illustrates conventional Session Mobility accompanied by Content Seamless.
Figure 2:
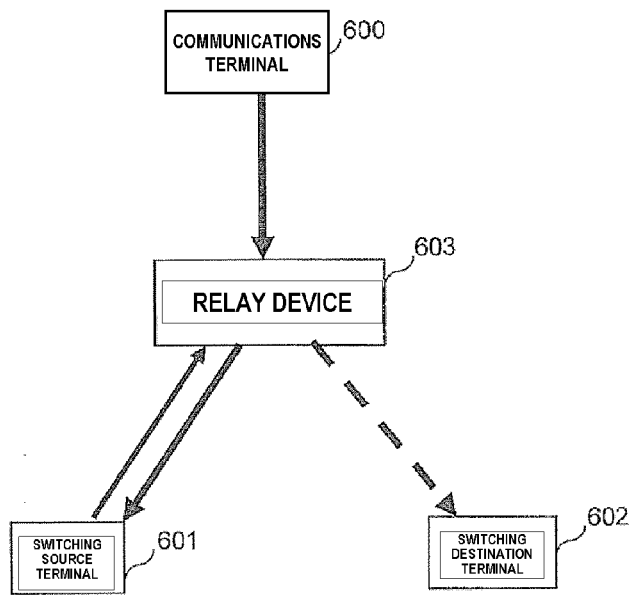
FIG. 2 illustrates conventional Session Mobility using a relay server.
Figure 3:
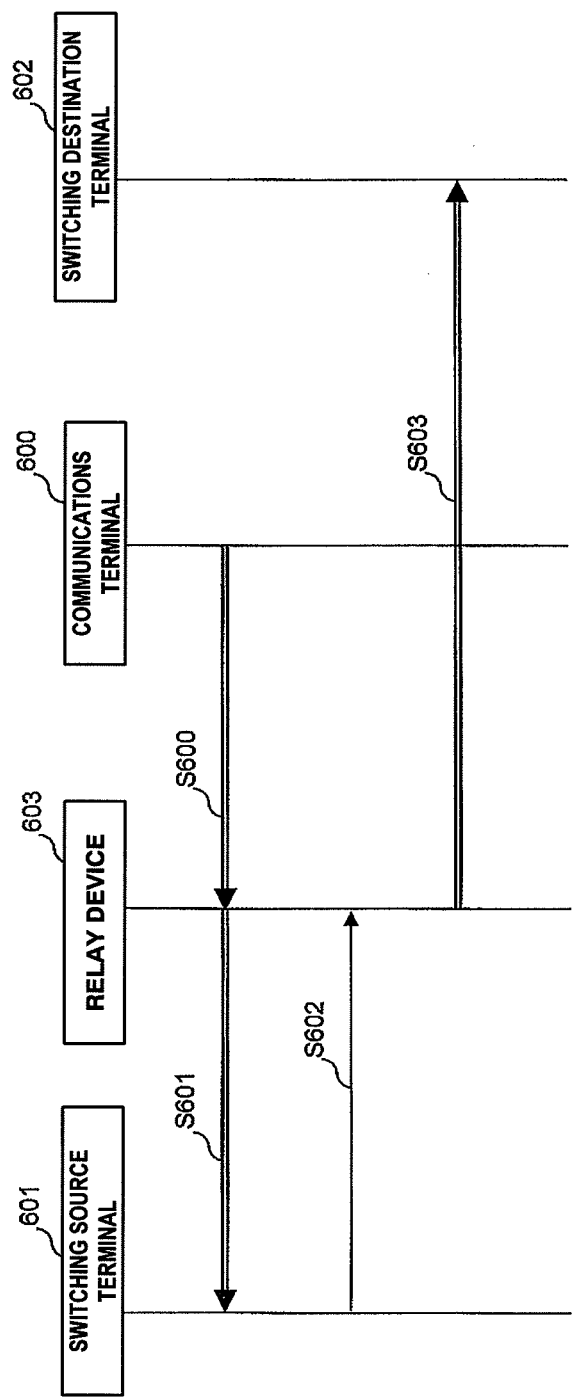
FIG. 3 shows a procedure in a conventional system including a relay device.
Figure 4:
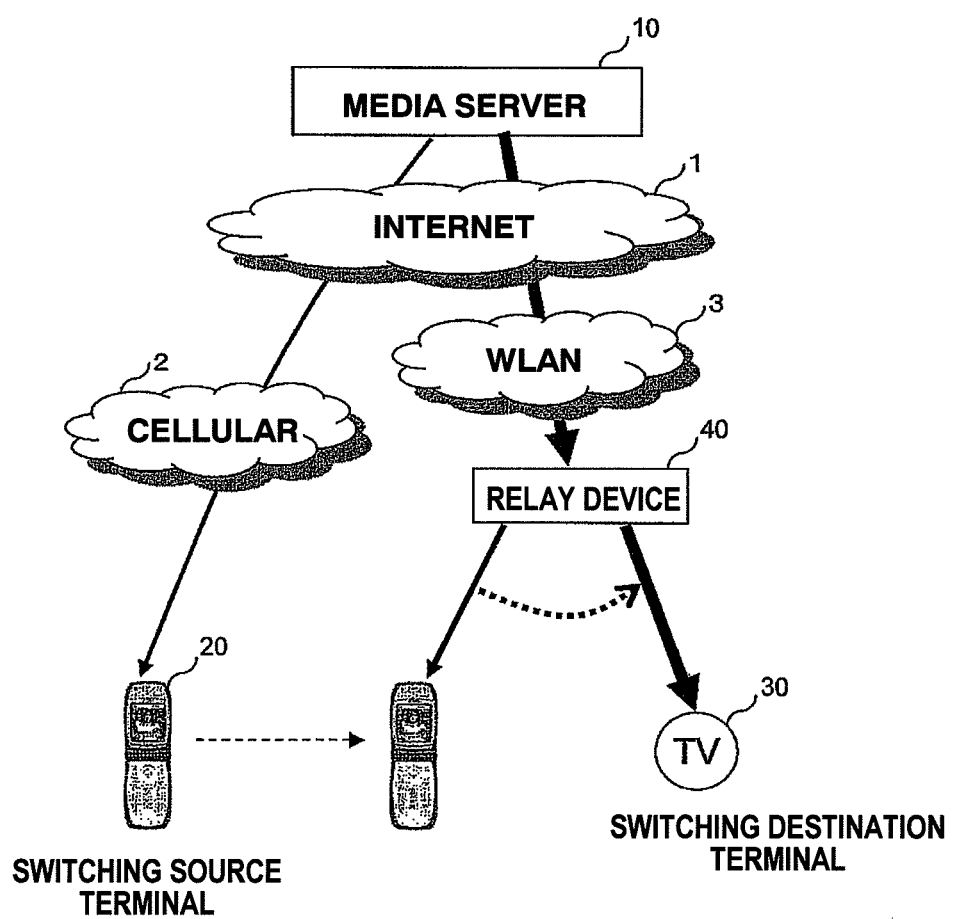
FIG. 4 shows an example of the whole system configuration including a relay device of a first embodiment.

As shown in FIG. 4, a media server (data delivery apparatus) 10 is configured to be connected with a mobile telephone (receiving terminal) 20 via the Internet 1 and a cellular network (mobile telephone network) 2.

The media server 10 is further configured to be connected with a relay device 40 via the Internet 1 and a WLAN (Wireless LAN) 3. The relay device 40 is configured such that it can be connected with the mobile telephone 20 and a television apparatus (communications terminal) 30. A home server, for example, can be used as the relay device 40.

While in the embodiment the Internet 1, the cellular network 2, and the WLAN 3, for example, are mentioned as communications networks, communications networks that can be applied in the invention are not limited to the above-mentioned examples. For example, a PAN (Personal Area Network) or an ad-hoc network can be used instead of the WLAN 3.

A home server is used as the relay device 40 in the embodiment, but the relay device 40 is not limited to home servers. For example, a personal computer, a two-way television, a game machine, or other information terminals may be applied as the relay device 40.

Moreover, the television apparatus 30 is illustrated as the communications terminal connected to the relay device 40 in the embodiment, but the communications terminal is not limited to television apparatuses. For example, an information appliance, a game machine, a personal computer, or the like may be used as the communications terminal.

Figure 5:
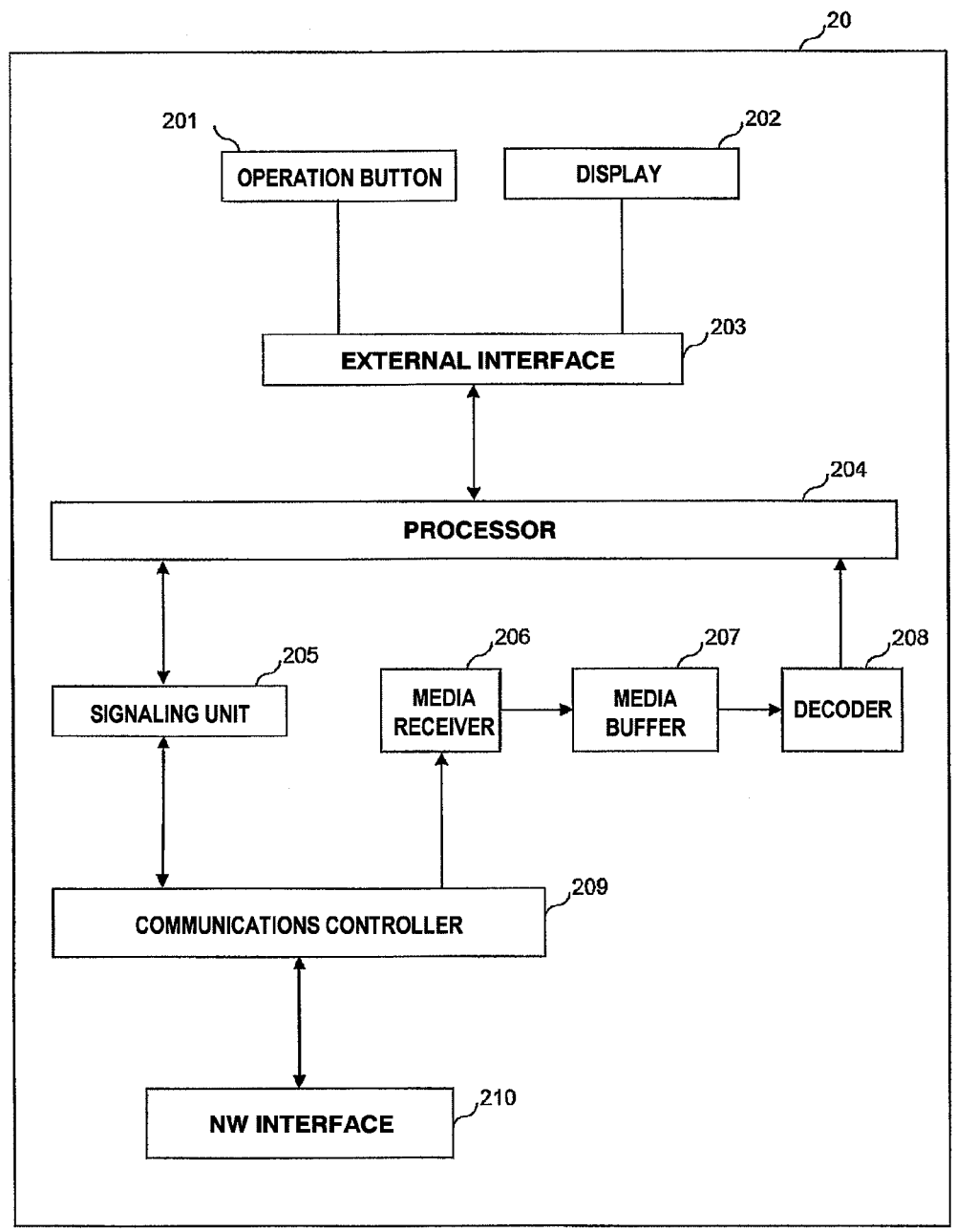
FIG. 5 shows a configuration example of a mobile telephone of the first embodiment.

FIG. 5 shows a configuration example of the mobile telephone 20.

As shown in FIG. 5, the mobile telephone 20 includes an operation button (input unit) 201, a display (display unit) 202, an external interface (external IF) 203, a processor 204, and a signaling unit 205. The mobile telephone 20 further includes a media receiver 206, a media buffer 207, a decoder 208, a communications controller 209, and an NW interface 210.

The external interface 203 has a function to exchange information with the operation button 201 and the display 202.

The processor 204 controls the operation of the whole mobile telephone 20.

The signaling unit 205 performs negotiation with the media server 10 or the relay device 40.

The media receiver 206 receives media data (e.g. image data) delivered from the media server 10.

The media buffer 207 temporarily holds media data received by the media receiver 206. By holding a certain amount of media data, the media buffer 207 smoothes out fluctuations (jitter) of the networks.

The decoder 208 decodes media data held in the media buffer 207.

The communications controller 209 performs control according to a communications protocol. The communications protocol mentioned here corresponds, for example, to the Transport Layer and Network Layer of the OSI (Open Systems Interconnection) Reference Model.

The NW (Network) interface 210 has a function to connect to both the cellular network 2 and the WLAN 3, and a function to detect the intensity of a radio wave. A wireless network card, for example, corresponds to the NW interface 210.

Figure 6:
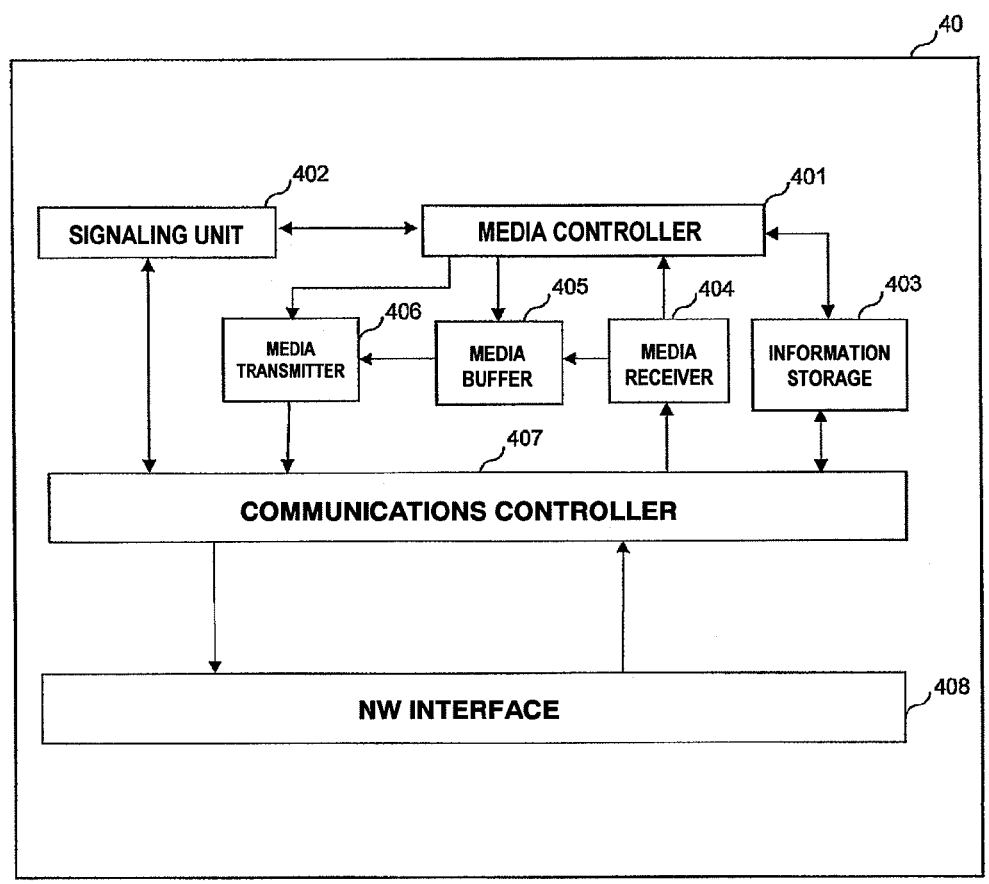
FIG. 6 shows a configuration example of the relay device of the first embodiment.

FIG. 6 shows a configuration example of the relay device 40.

As shown in FIG. 6, the relay device 40 includes a media controller (controller) 401, a signaling unit 402, an information storage (data storage) 403, and a media receiver (receiver) 404. The relay device 40 further includes a media buffer (buffer) 405, a media transmitter (transfer unit) 406, a communications controller 407, and an NW interface (communications unit) 408.

The media controller 401 makes a transmission request to the media server 10 for media data corresponding to information stored in the information storage 403 and indicating a processing capacity. The information storage 403 will be described later. The media controller 401 instructs the media transmitter 406 to transfer media data to a communications terminal connected to the relay device 40 (e.g. the television apparatus 30). At this time, the media controller 401 instructs to transfer media data corresponding to a media-related processing capacity (hereinafter also referred to as a media processing capacity) of the communications terminal (the television apparatus 30).

The signaling unit 402 performs negotiation with the media server 10, the mobile telephone 20, or the television apparatus 30.

The information storage 403 stores information indicating a media processing capacity. One example of a media processing capacity is information indicating whether a specific coding scheme is supported or not. While media processing capacities for a certain moving image coding scheme include resolution that can be handled by a terminal, a frame rate (time), and an S/N ratio (Signal to Noise Ratio), resolution will be primarily described as a media processing capacity in the embodiment.

Figures 7, 8:
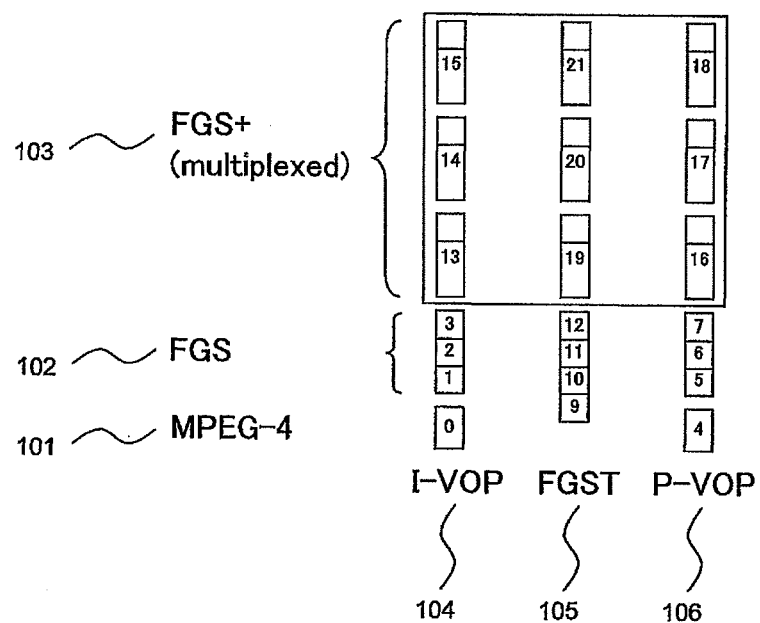
FIG. 7 shows a configuration example of a media processing capacity table of an information storage of the relay device of the first embodiment.
FIG. 8 shows a configuration example of media data.

The information storage 403 stores a media processing capacity table shown in FIG. 7. The media processing capacity table shown in FIG. 7 has information on Device 3011, Resolution 3012, and Level 3013.

The Device 3011 is information indicating device identification (device ID) for identifying the mobile telephone 20 or other devices. Devices whose information is stored in the media processing capacity table are, for example, devices belonging to the WLAN 3 like the relay device 40.

The Resolution 3012 is information indicating resolution that is the highest processing capacity of a device.

The Level 3013 is information indicating a level of resolution of a device. In the embodiment, the Level 3013 is classified, for example, into three levels (high, medium, low) in advance according to the value of resolution.

The media receiver 404 receives media data from the media server 10.

The media buffer 405 temporarily holds media data received by the media receiver 404. By holding a certain amount of media data, the media buffer 405 smoothes out fluctuations (jitter) of the networks.

The media transmitter 406 transmits media data held in the media buffer 405. Specifically, the media transmitter 406 acquires from the media buffer 405 media data corresponding to a processing capacity of a communications terminal (e.g. the television apparatus 30) to which the media controller 401 instructed to transfer. The media transmitter 406 then transmits the acquired media data to the communications terminal (e.g. the television apparatus 30).

The communications controller 407 performs control according to a communications protocol. The communications protocol mentioned here corresponds, for example, to the Transport Layer and Network Layer of the OSI (Open Systems Interconnection) Reference Model.

The NW (Network) interface 408 has a function to detect the intensity of a radio wave. A wireless network card, for example, corresponds to the NW interface 408.

A configuration example of media data transmitted from the media server 10 will next be described.

FIG. 8 shows a configuration example of media data. An MPEG-4 scalable stream (image stream), for example, is used as media data in the embodiment. This image stream is divided into a plurality of layers, for example, and transmitted.

As shown in FIG. 8, media data is divided into three layers: a base layer 101, an enhancement layer 102, and a plus (+) enhancement layer 103. In FIG. 8, numbers from 0 to 21 are assigned to each divided data for illustrative purposes.

The base layer 101 is a layer for ensuring preset basic quality (e.g. a coding data rate of 100 kbps and the size of an image). This base layer 101 is always transmitted.

The enhancement layer 102 and the plus (+) enhancement layer 103 are layers for complementing the quality of the base layer 101. Part or the whole of these enhancement layers 102 and 103 are arbitrarily coded according to the performance of a destination terminal or the like.

Specifically, data of the base layer 101 is coded, for example, by using the MPEG-4 Simple Profile or the MPEG-4 Advanced Simple Profile. In FIG. 8, pieces of data assigned with symbols 0 and 4 belong to the base layer 101.

The enhancement layer 102 is used, for example, as an S/N ratio enhancement layer for improving an S/N ratio. Data of the enhancement layer 102 is coded, for example, by using the MPEG-4 FGS (Fine Granular Scalability). The MPEG-4 FGS is defined in ISO/IEC 14496-2 Amendment 4: Streaming Video Profile.

In FIG. 8, pieces of data assigned with symbols 1 to 3, 5 to 7, and 9 to 12 belong to the enhancement layer 102. The enhancement layer 102 is further divided into the following layers: a first layer of the enhancement layer 102 having pieces of data assigned with symbols 1, 9, 10, and 5; a second layer having pieces of data assigned with symbols 2, 11, and 6; and a third layer having pieces of data assigned with symbols 3, 12, and 7.

The plus enhancement layer 103 is used, for example, as a resolution enhancement layer for improving resolution. Data of the plus enhancement layer 103 is also coded, for example, by using the MPEG-4 FGS (Fine Granular Scalability).

In FIG. 8, pieces of data assigned with symbols 13 to 21 belong to the plus enhancement layer 103. The plus enhancement layer 103 is also further divided into the following layers: a first layer of the plus enhancement layer 103 having pieces of data assigned with symbols 13, 19, and 16; a second layer having pieces of data assigned with symbols 14, 20, and 17; and a third layer having pieces of data assigned with symbols 15, 21, and 18.

Pieces of data belonging to the base layer 101 (symbols 0 and 4) are classified into an I-VOP frame 104 or a P-VOP frame 106. Pieces of data belonging to the enhancement layer 102 (symbols 1 to 3, 5 to 7, and 9 to 12) and pieces of data belonging to the plus enhancement layer 103 (symbols 13 to 21) are each classified into the I-VOP frame 104, an FGST frame 105, and the P-VOP frame 106. VOP stands for Video Object Plane.

The I-VOP frame 104 is an intra-frame coded intra (I) frame. The FGST frame 105 is a time enhancement frame. This time enhancement will improve a frame rate.

The P-VOP frame 106 is a unidirectional predictive inter (P) frame.

An example of data transmitted from the media server 10 will next be described with reference to FIG. 9.

FIG. 9 shows an example of data to be transmitted in accordance with quality levels.

The example of data shown in FIG. 9 shows an association between a quality 3014 and the Level 3013 thereof and data to be transmitted from the media server 10. There are three types for the quality 3014, namely a frame rate, resolution, and image quality (S/N). There are three levels for the Level 3013, namely low, medium, and high. The association between the quality 3014 and the Level 3013 thereof and transmission data in FIG. 9 is held, for example, as a quality level table in the media server 10.

The level of the frame rate changes between low, medium, and high according to the combination of the three frames, i.e. the I-VOP frame, the P-VOP frame, and the FGST frame. For example, the combination including only the I-VOP frame means the low-level frame rate.

The level of resolution changes between low, medium, and high according to the combination of the three layers, i.e. the base layer, the FGS layer, and the FGS+ layer. For example, the combination including only the base layer means the low-level resolution.

The level of image quality changes between low, medium, and high according to the combination of each layer, i.e. the base layer, the FGS layer, and the FGS+ layer. For example, the combination including only the base layer, the first layer of the FGS layer, and the first layer of the FGS+ layer means the low-level image quality.

Specifying the quality 3014 and the Level 3013 thereof determines data to be transmitted. Any one or all of the frame rate, resolution, and image quality (S/N) may be specified as the quality. If all the items are specified, data common to each item will be transmitted. For example, if the low-level frame rate (symbols 0, 1 to 3, and 13 to 15), the low-level resolution (symbols 0 and 4), and the low-level image quality (S/N) (symbols 0 and 4, symbols 1, 9, 10, and 5, and symbols 13, 19, and 16) are specified, only the piece of data assigned with the common symbol 0 is transmitted.

Described next with reference to FIG. 10 will be a switching process for a case where a destination of data from the media server 10 is switched in the relay device 40 from the mobile telephone 20 to the television apparatus 30.

Figure 10:
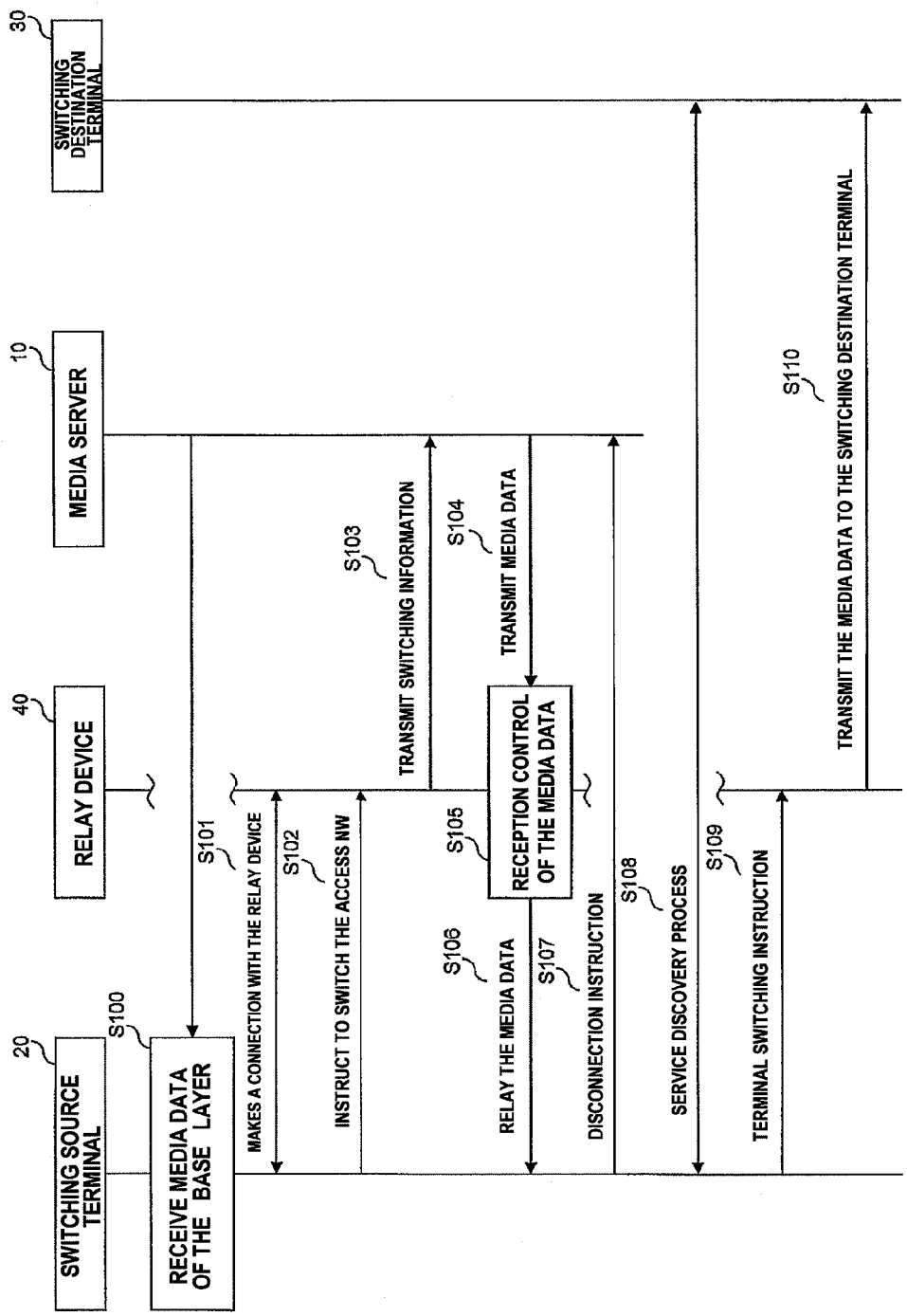
FIG. 10 is a sequence diagram showing a switching process of the whole system including the relay device of the first embodiment.

FIG. 10 is a sequence diagram showing a switching process of the whole system including the relay device 40. In this description, since the destination from the media server 10 is switched from the mobile telephone 20 to the television apparatus 30, the mobile telephone 20 is called the switching source terminal 20 and the television apparatus 30 is called the switching destination terminal 30.

First, a user's operation of the operation button 201 causes the switching source terminal 20 to access the media server 10 via the cellular network 2 and Internet 1 and establish a session between the switching source terminal 20 and the media server 10. The switching source terminal 20 then receives media data of the base layer from the media server 10 (step S100). That is, the three types of quality of the media data here shall be, for example, all low-level (see FIG. 9).

Specifically, the media receiver 206 of the switching source terminal 20 receives media data from the media server 10 via the NW interface 210 and communications controller 209. The media buffer 207 then temporarily holds the media data received by the media receiver 206. The decoder 208 acquires the media data from the media buffer 207 and decodes it. The processor 204 then reproduces the media data decoded by the decoder 208 on the display 202 via the external interface 203.

The switching source terminal 20 continues to receive media data from the media server 10 until the switching source terminal 20 makes a disconnection instruction at a later-described step S107.

Afterward, the switching source terminal 20 (the NW interface 210) moves to the area surrounding the relay device 40. The switching source terminal 20 then makes a connection with the relay device 40 (step S101). Specifically, the NW interface 210 of the switching source terminal 20 detects the intensity of a radio wave transmitted from the WLAN 3. The NW interface 210 then makes a connection to the WLAN 3 if the above-mentioned detected intensity exceeds a certain value. During this, the NW interface 210 is in a state where its connection with the cellular network 2 is maintained. When connected to the WLAN 3, the switching source terminal 20 becomes able to communicate with the relay device 40.

The switching source terminal 20 (the signaling unit 205) then instructs the relay device 40 to switch the access NW, for example, from the cellular network 2 to the WLAN 3 (step S102). Specifically, the signaling unit 205 of the switching source terminal 20 transmits the device ID and quality level (e.g. information indicating that the resolution is low-level) of the switching source terminal 20 to the relay device 40 via the communications controller 209 and NW interface 210.

Upon receiving the above switching instruction, the relay device 40 transmits switching information on the switching instruction to the media server 10 via the WLAN 3 and Internet 1 (step S103). Besides the above-mentioned device ID and quality level of the switching source terminal 20, the switching information to be transmitted here includes the quality level of other devices (devices other than the switching source terminal 20) connected via the relay device 40 and WLAN 3. Therefore, the switching information includes the quality level of the switching destination terminal 30 (e.g. information indicating that the resolution is high-level) as the above-mentioned level of other devices.

The transmission of the switching information at the step S103 is performed, for example, by using the INVITE method of the SIP protocol.

After that, upon receiving the switching information transmitted from the relay device 40 (step S103), the media server 10 establishes a session with the relay device 40 and then transmits media data of the highest quality level included in the above switching information (e.g. the resolution is high-level) to the relay device 40 via the Internet 1 and WLAN 3 (step S104).

The relay device 40 receives the media data from the media server 10, and performs reception control of the media data (step S105). Specifically, the relay device 40 extracts media data corresponding to the quality level of the switching source terminal 20 from the media data received from the media server 10.

The relay device 40 then relays the media data extracted with the above reception control, i.e. the media data corresponding to the quality level of the switching source terminal 20, to the switching source terminal 20 (step S106).

The switching source terminal 20 (the signaling unit 205) then instructs the media server 10 via the cellular network 2 and Internet 1 to disconnect the session established at the step S100 between the switching source terminal 20 and the media server 10 (step S107). Specifically, the signaling unit 205 of the switching source terminal 20 transmits information including the device ID of the switching source terminal 20 to the media server 10. This transmission of the disconnection instruction is performed, for example, by using the BYE method of the SIP protocol. This breaks the connection between the switching source terminal 20 and the media server 10. With that, the switching source terminal 20 completes the switching of its access NW from the cellular network 2 to the WLAN 3. The switching source terminal 20 receives media data from the media server 10 via the relay device 40.

The switching source terminal 20 then performs a service discovery process on the switching destination terminal 30 (step S108). The service discovery process is performed, for example, by using the SSDP (Simple Service Discovery Protocol) of UPnP (Universal Plug and Play). When this SSDP is used, the switching source terminal 20 transmits in the WLAN 3 a message indicating a type of service. Upon receiving this message, the switching destination terminal 30 sends the URL of the switching destination terminal 30 back to the switching source terminal 20 if the service concerned matches a service that can be provided by the switching destination terminal 30. The switching destination terminal 30 thus notifies the switching source terminal 20 that the switching destination terminal 30 exists in the WLAN 3 (the device ID or the like).

The switching source terminal 20 of the embodiment confirms using the SSDP the existence of the switching destination terminal 30 that performs, for example, a media data reproduction service.

The switching source terminal 20 then instructs the relay device 40 to switch the terminal to the switching destination terminal 30 (step S109). At this time, the switching source terminal 20 transmits to the relay device 40 a switching instruction including the device ID of the switching destination terminal 30 acquired by using the service discovery process.

If the switching destination terminal 30 is not a terminal having the highest quality level among the other devices (devices other than the switching source terminal 20) connected to the relay device 40 via the WLAN 3, the relay device 40 after the step 109 makes a transmission request to the media server 10 for media data of the quality level corresponding to a processing capacity of the switching destination terminal 30 that is designated by the above switching instruction. The media server 10 may then transmit to the relay device 40 only the media data of the quality level corresponding to the processing capacity for which the transmission request was made. As a result, the media server 10 has only to transmit the media data corresponding to the processing capacity of the switching destination terminal 30 that is designated by the switching instruction, instead of the media data of the highest quality level. This can reduce the load on media data transmission.

Upon receiving the switching instruction of the access NW from the switching source terminal 20, the relay device 40 transmits the media data that it has started to receive at the step S104 to the switching destination terminal 30 (step S110). Specifically, the relay device 40 extracts media data of the quality level corresponding to the device ID of the switching destination terminal 30 that is designated by the above switching instruction. The relay device 40 then transmits the extracted media data to the switching destination terminal 30. The relay device 40 also finishes transmitting media data to the switching source terminal 20. In this way, the destination of media data from the media server 10 is switched from the mobile telephone 20 to the television apparatus 30, and the terminal switching is completed.

In the flow shown in FIG. 10, the order of the steps S101 to S110 may be changed within the spirit of the invention.

For example, the step S108 of the service discovery process may be performed between the step S106 (the media data relay process) and the step S107 (the disconnection instruction process).

At the step S104 in the flow shown in FIG. 10, the description has been made for, but not limited to, the case where the media server 10 transmits media data of the highest quality level included in the switching information received from the relay device 40. For example, the media server 10 may transmit media data of a preset highest quality level (FIG. 9) regardless of the quality level included in the above switching information.

The switching process of the relay device 40 shown in FIG. 10 will next be described in detail.

Figure 11:
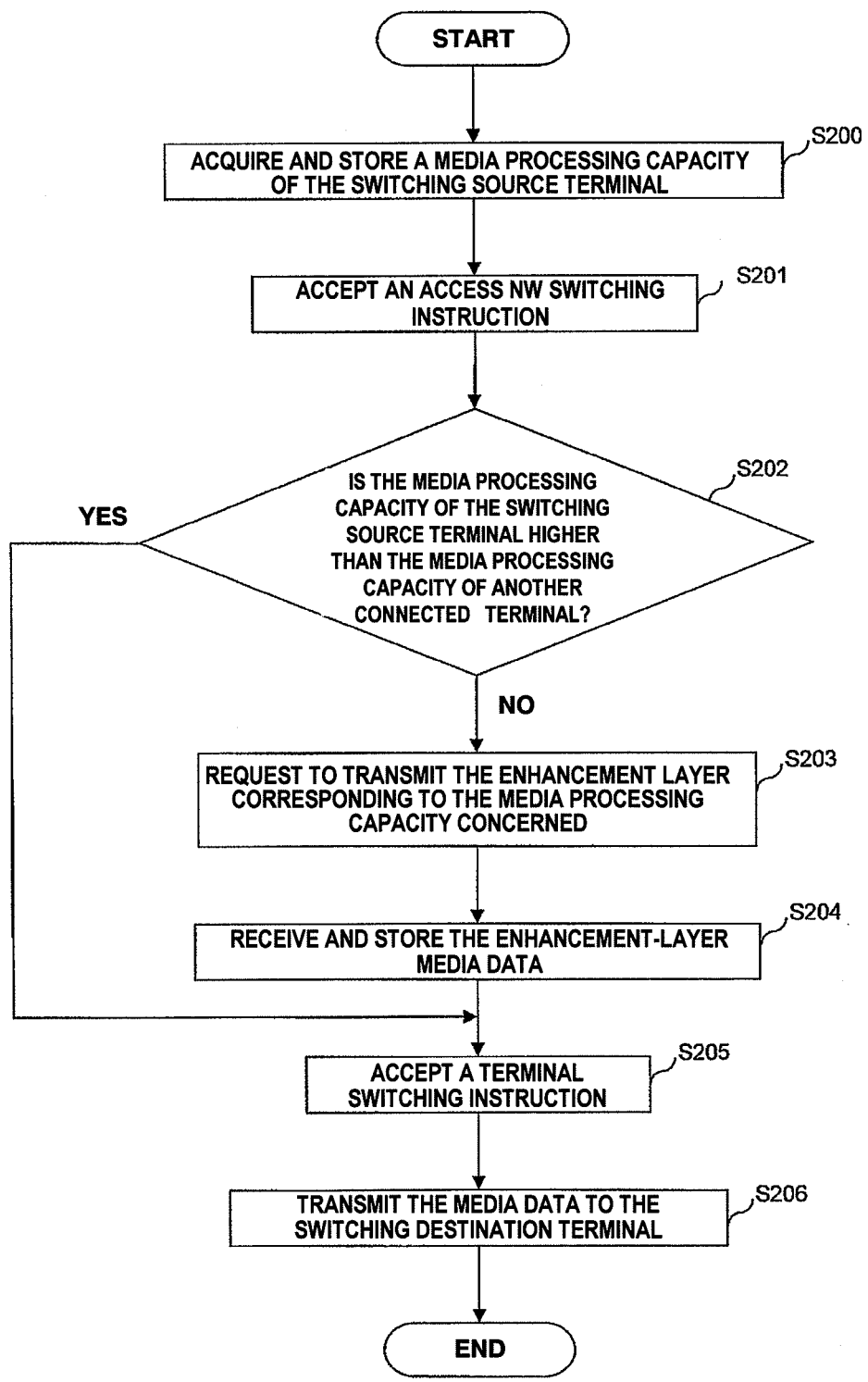
FIG. 11 is a flowchart showing the switching process of the relay device of the first embodiment.

FIG. 11 is a flowchart showing the switching process of the relay device 40.

At a step S200, the relay device 40 (the signaling unit 402) acquires and stores a media processing capacity of the switching source terminal 20 (including the device ID of the switching source terminal 20). Just when the switching source terminal 20 enters the communication range of the WLAN 3 and performs the connection process on the relay device 40 (S101 in FIG. 10), the relay device 40 acquires the media processing capacity of the switching source terminal.

Specifically, the relay device 40 (the signaling unit 402) acquires the above-mentioned media processing capacity (e.g. a resolution of 352×288) from the switching source terminal 20 via the NW interface 408 and communications controller 407. Then, the media controller 401 stores the media processing capacity acquired by the signaling unit 402 in the information storage 403. When storing the above media processing capacity, the media controller 401 chooses from the three preset levels a level corresponding to the media processing capacity concerned. The media controller 401 then stores the device ID, above acquired media processing capacity, and above chosen level of the switching source terminal 20 in the media processing capacity table (see FIG. 7).

Also as to a terminal other than the switching source terminal 20, the relay device 40 stores its device ID, media processing capacity, and level in the media processing capacity table when making a connection with that terminal (see FIG. 7).

At a step S201, the relay device 40 (the signaling unit 402) accepts an access NW switching instruction (a process corresponding to S102 in FIG. 10).

Specifically, the relay device 40 (the signaling unit 402) accepts a message indicating the above switching instruction (including the device ID and quality level of the switching source terminal 20) from the switching source terminal 20 via the NW interface 408 and communications controller 407.

At a step S202, the relay device 40 (the media controller 401) determines whether the media processing capacity of the switching source terminal 20 is higher than that of another connected terminal (the switching destination terminal 30 in the embodiment) or not with reference to the media processing capacity table (FIG. 7) of the information storage 403.

Then, if it is determined as a result of the above determination that the media processing capacity of the switching source terminal 20 is not higher than that of the switching destination terminal 30 (No at the step S202), the relay device 40 performs a process of a step S203. On the other hand, if it is determined that the media processing capacity of the switching source terminal 20 is higher than that of the switching destination terminal 30 (Yes at the step S202), the relay device 40 performs a process of a step S205.

At the step S203, the relay device 40 (the media controller 401) requests the media server 10 to transmit media data of the quality level corresponding to the media processing capacity of the other connected terminal whose media processing capacity is higher than the switching source terminal 20 (e.g. high-level resolution of the television apparatus 30) (a process corresponding to S103 in FIG. 10).

Specifically, the relay device 40 (the media controller 401) reads from the media processing capacity table (FIG. 7) a quality and a level thereof as the media processing capacity of the other connected terminal. The relay device 40 (the media controller 401) then transmits a message including the media processing capacity defined by the quality and the level thereof (switching information) to the media server 10 via the signaling unit 402, communications controller 407, and NW interface 408.

Next at a step S204, the relay device 40 receives from the media server 10 the enhancement-layer media data for which it made the above transmission request and stores the media data (a process corresponding to S105 in FIG. 10).

Specifically, the media server 10 transmits to the relay device 40 the media data of the quality level (see FIG. 9) corresponding to the media processing capacity for which the relay device 40 made the transmission request (e.g. information indicating high-level resolution).

The relay device 40 (the media receiver 404) then receives the media data transmitted from the media server 10 via the NW interface 408 and communications controller 407. The relay device 40 (the media buffer 405) temporarily holds the media data received by the media receiver 404.

After that, upon receiving from the media controller 401 an instruction as to the level of the media processing capacity of the switching source terminal 20 (the one acquired and stored at S200), the media transmitter 406 of the relay device 40 extracts media data of that quality level from the media buffer 405. The media transmitter 406 of the relay device 40 then transmits the media data to the switching source terminal 20 via the communications controller 407 and NW interface 408 (a process corresponding to S106 in FIG. 10).

At the step S205, the relay device 40 (the signaling unit 402) accepts an instruction to switch to the switching destination terminal 30 (a process corresponding to S109 in FIG. 10).

Specifically, the relay device 40 (the signaling unit 402) accepts a message indicating the above switching instruction (including the device ID of the switching destination terminal 30) from the switching source terminal 20 via the NW interface 408 and communications controller 407.

At a step S206, the relay device 40 (the media transmitter 406) transmits the media data to the switching destination terminal 30 that is designated by the switching instruction at the step S205 via the communications controller 407 and NW interface 408 (a process corresponding to S110 in FIG. 10).

Specifically, upon receiving from the media controller 401 an instruction as to the level of the media processing capacity of the switching destination terminal 30, the media transmitter 406 of the relay device 40 extracts media data of that quality level from the media buffer 405. The media transmitter 406 of the relay device 40 then transmits the media data to the switching destination terminal 30 via the communications controller 407 and NW interface 408 (a process corresponding to S110 in FIG. 10).

As described up to this point, at the time of switching from the switching source terminal 20 to the switching destination terminal 30, the relay device 40 transfers to the switching destination terminal 30 media data corresponding to the processing capacity of the switching destination terminal 30. As a result, even when the processing capacity is different between the switching source terminal 20 and the switching destination terminal 30, the switching can be smoothly performed by using media data transmitted to the switching source terminal 20, without reconnecting a session corresponding to the processing capacity of the switching destination terminal 30. That is, a terminal can be switched independently of a media processing capacity of a terminal chosen as one to which switching is directed. In addition, the media data to be transferred by the relay device 40 is data that has been held in the media buffer 405 inside the relay device 40. Consequently, the switching destination terminal 30 can reproduce the data immediately without buffering it in a data receiving buffer inside the switching destination terminal 30, and therefore an output delay is small.

(Second Embodiment)

A relay device of a second embodiment is different from that of the first embodiment in that a terminal is switched to a desired terminal among a plurality of connected terminals.

Figure 12:
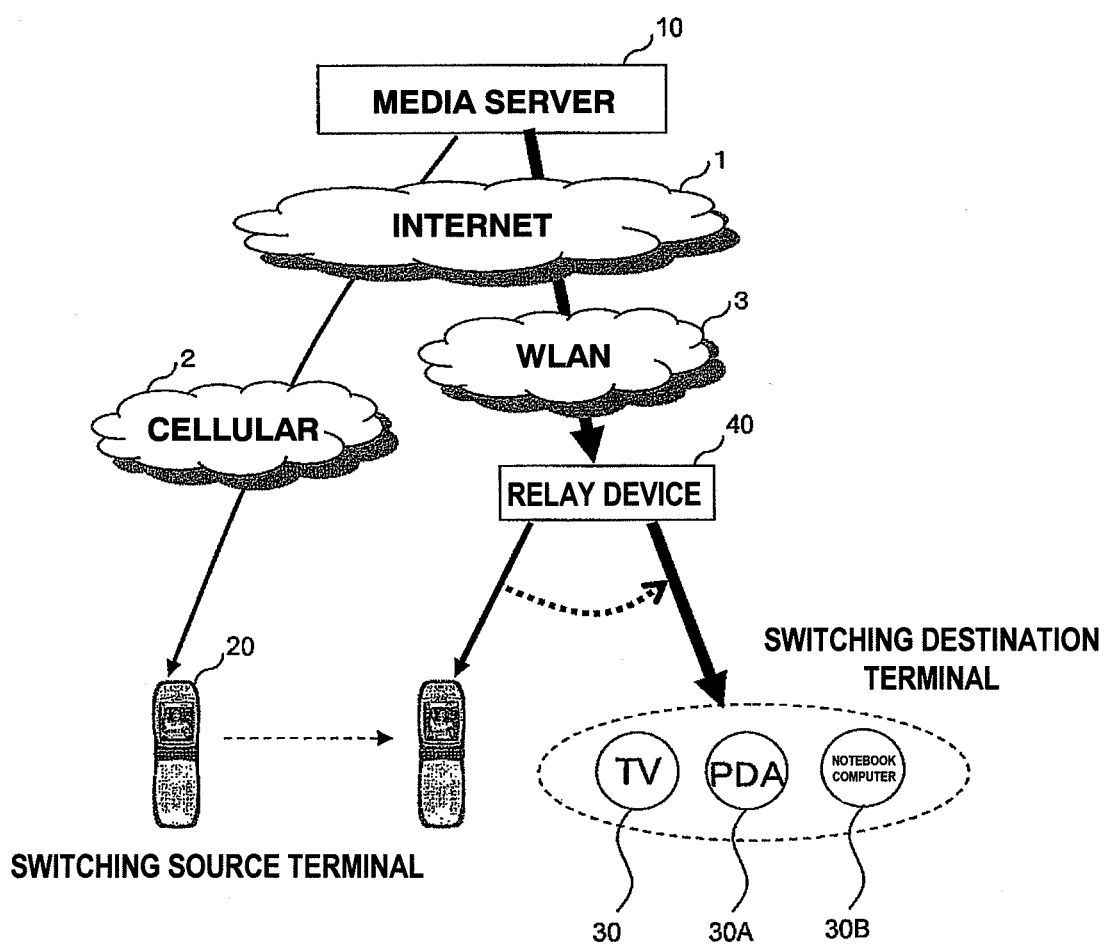
FIG. 12 shows an example of the whole system configuration including a relay device of a second embodiment.

FIG. 12 shows an example of the whole system configuration including the relay device of the second embodiment of the invention. The same components as the first embodiment are designated by the same symbols (including terms) as the first embodiment, and their repeated descriptions are omitted as appropriate.

As shown in FIG. 12, the relay device 40 is connected with the television apparatus 30, a PDA 30A, and a notebook computer 30B via the WLAN 3. That is, there are three candidates for the switching destination terminal in the second embodiment. Other components of the whole system including the relay device 40 are the same as the system of the first embodiment (see FIG. 4).

Figure 13:
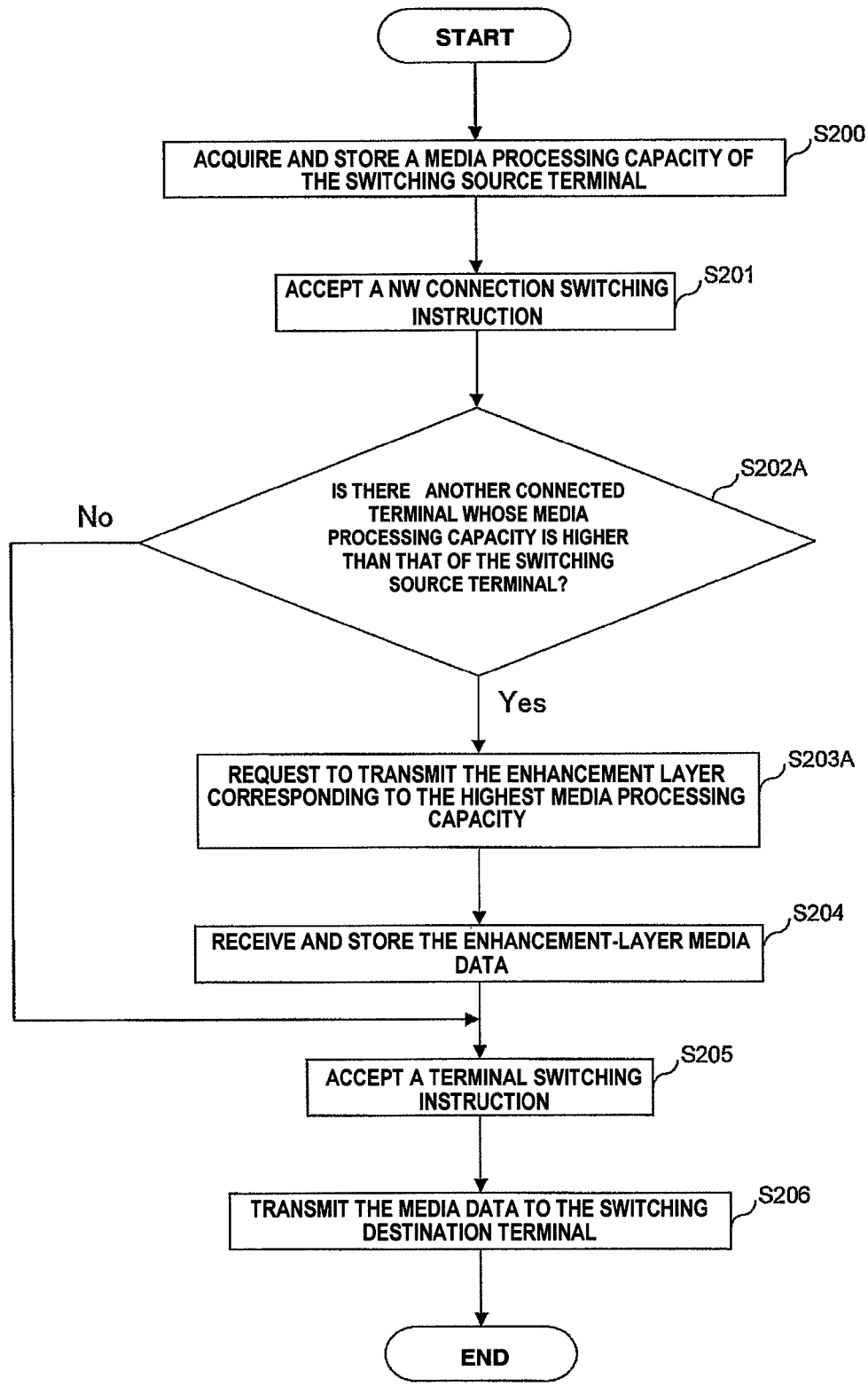
FIG. 13 is a flowchart showing a switching process of the relay device of the second embodiment.

FIG. 13 is a flowchart showing a switching process of the relay device 40 of the second embodiment. The switching process in FIG. 13 is different from that of the first embodiment in that it includes two steps S202A and S203A instead of the two steps S202 and S203 of the flow in the first embodiment. In the following, a description will be made mainly on the above two steps S202A and S203A.

The media processing capacity table shown in FIG. 7 has information on the Resolution 3012 and Level 3013 of each of the television apparatus 30, PDA 30A, and notebook computer 30B. This is because the following acquiring and storing process is performed (see the step S200). That is, when each terminal of the television apparatus 30, PDA 30A, and notebook computer 30B is connected to the relay device 40 (is connected to the WLAN 3), the relay device 40 acquires from each terminal its own device ID and media processing capacity (e.g. the value of resolution of an implemented display). The relay device 40 then chooses a level corresponding to the acquired media processing capacity (e.g. high-level or the like). The relay device 40 stores the above media processing capacity level in the media processing capacity table (FIG. 7) for each of the acquired device IDs.

At the step S202A, the relay device 40 (the media controller 401) determines whether there is another connected terminal whose media processing capacity is higher than that of the switching source terminal 20 or not with reference to the media processing capacity table (FIG. 7) of the information storage 403 (a process corresponding to S102 in FIG. 10).

Specifically, the relay device 40 (the media controller 401) determines whether there is a terminal that has a processing capacity higher than the media processing capacity of the switching source terminal 20 (e.g. low-level resolution) among the television apparatus 30, the PDA 30A, and the notebook computer 30B or not with reference to the media processing capacity table (FIG. 7).

Then, if it is determined as a result of the above determination that there is no terminal whose media processing capacity is higher than that of the switching source terminal 20 (No at the step S202A), the relay device 40 performs the process of the step S205 as in the case of FIG. 11.

On the other hand, if it is determined that there is a terminal whose media processing capacity is higher than that of the switching source terminal 20 (Yes at the step S202A), the relay device 40 performs a process of the step S203A.

The relay device 40 (the media controller 401) of the embodiment determines that, for example, the television apparatus 30 and the PDA 30A are the terminals that have a processing capacity higher than the media processing capacity of the switching source terminal 20 (Yes at the step S202A), and goes to the step S203A.

At the step S203A, the relay device 40 (the media controller 401) makes a transmission request to the media server 10 for media data (see FIG. 9) of the quality level corresponding to the highest media processing capacity (e.g. the resolution of the television apparatus 30 is high-level) among those of connected terminals (e.g. the television apparatus 30 and the PDA 30A) whose media processing capacity has been determined to be higher than that of the switching source terminal 20 at the step S202A (a process corresponding to S103 in FIG. 10).

Specifically, the relay device 40 (the media controller 401) reads the above media processing capacity level from the media processing capacity table (FIG. 7). The relay device 40 (the media controller 401) then transmits a message including the media processing capacity and above read level (switching information) to the media server 10 via the signaling unit 402, communications controller 407, and NW interface 408. In this way, the relay device 40 subsequently goes to the steps S204 through S206 to transmit media data to the switching destination terminal, as in the case of FIG. 11.

That is, first at the step S204, the relay device 40 receives from the media server 10 the media data of the quality level corresponding to the highest media processing capacity (e.g. high-level resolution that the television apparatus 30 has) and stores the media data. Next at the step S205, the relay device 40 accepts from the switching source terminal 20 an instruction to switch to a desired terminal (e.g. the television apparatus 30) among the television apparatus 30, the PDA 30A, and the notebook computer 30B. The method of this switching instruction is as follows. First, for example, a choice menu screen to choose a desired terminal (including the television apparatus 30, the PDA 30A, and the notebook computer 30B) is displayed on the switching source terminal 20 (the display 202). Then, on the switching source terminal 20 (the display 202), a desired terminal is chosen from the choice menu screen by using the operation button 201.

Then, at the step S206, the relay device 40 transmits media data of the quality level (e.g. high-level resolution) corresponding to the terminal designated by the above switching instruction, i.e. the switching destination terminal (e.g. the television apparatus 30), to the switching destination terminal (e.g. the television apparatus 30).

Alternatively, at the step S205, if the terminal designated by the switching instruction does not have the highest media capacity, the relay device 40 may make a transmission request to the media server 10 for media data of the layer corresponding to that terminal.

As described above, the relay device 40 makes a transmission request to the media server 10 for media data corresponding to the highest processing capacity among those of a plurality of terminals having different processing capacities (see the step S203A), switches to the terminal designated by the switching instruction at the step S205, and transmits media data corresponding to that switching destination terminal, to the switching destination terminal.

For this reason, even if there were a plurality of terminals as candidates for the switching destination terminal, the relay device 40 would be able to hold media data corresponding to the highest processing capacity before the terminal switching. Consequently, whatever terminal the relay device 40 switched to, the relay device 40 would be able to acquire media data corresponding to that terminal from data held in the media buffer 405 and transmit it, regardless of the processing capacity level of the terminal. As a result, even when the processing capacity is different between the switching source terminal 20 and the switching destination terminal 30, the switching can be smoothly performed by using media data transmitted to the switching source terminal 20, without reconnecting a session corresponding to the processing capacity of the switching destination terminal 30.

Moreover, the switching destination terminal 30 can immediately reproduce the media data transmitted from the relay device 40, so an output delay becomes small.

While there have been described what are at present considered to be preferred embodiments of the invention, it will be understood that various modifications and variations may be made thereto, and it is intended that appended claims cover all such modifications and variations as fall within the true spirit and scope of the invention.

Industrial Applicability

The relay device of the invention is useful when media data from a server is switched seamlessly between different terminals.

The invention claimed is:

1. A relay device comprising:
    a communication unit operable to make a connection with a receiving terminal that is receiving, not via the relay device, media data transmitted from a data delivery apparatus;
    a data storage for storing information indicating a media data processing capacity of the receiving terminal and indicating a media data processing capacity of other communications terminals different from the receiving terminal;
    a controller for making a transmission request to the data delivery apparatus for the media data corresponding to the information stored in the data storage, the transmission request being a request for the media data corresponding to a highest performance level of the media data processing capacity of the other communications terminals and the receiving terminal;
    a receiver for receiving the media data transmitted from the data delivery apparatus in response to the transmission request from the controller;
    a buffer for holding the media data received by the receiver;
    a signaling unit operable to accept a terminal switching instruction from the receiving terminal, the terminal switching instruction including information of a switching destination terminal which is one of the other communications terminals; and
    a transfer unit operable to transfer, to the switching destination terminal, the media data held in the buffer and corresponding to the media data processing capacity of the switching destination terminal, after the terminal switching instruction is accepted by the signaling unit.

2. The relay device according to claim 1, wherein a data configuration of the media data has a plurality of layers corresponding to the media data processing capacity.

3. The relay device according to claim 1, wherein the processing capacity is any one of a frame rate, a S/N ratio, or a resolution.

4. A relay device for transmitting media data transmitted from a data delivery apparatus to a communications terminal, the relay device comprising:
    a connection processor for, upon receiving a connection request from a first communications terminal that is receiving, not via the relay device, media data transmitted from the data delivery apparatus, making a connection with the first communications terminal;
    a data storage for storing (i) information indicating a processing capacity of a communications terminal that has previously been connected to the relay device and (ii) information indicating a processing capacity of the first communications terminal;
    a controller for making a transmission request to the data delivery apparatus for the media data corresponding to the information stored in the data storage, the transmission request being a request for the media data corresponding to a prescribed processing capacity that is equal to or higher than a highest processing capacity between a processing capacity of a communications terminal and the processing capacity of the first communications terminal indicated by the information stored in the data storage;

a media data receiver for receiving the media data, from the data delivery apparatus in response to the transmission request, and storing the received media data in a buffer, a media data transmitter for reading the media data corresponding to the processing capacity of the first communications terminal from the media data stored in the buffer, and transmitting the read media data to the first communications terminal; and a switching instruction receiver for receiving an instruction to switch a media data receiving terminal from the first communications terminal to a second communications terminal connected to the relay device, wherein the media data transmitter, upon receiving the switching instruction, reads, from the media data buffer, media data corresponding to a processing capacity of the second communications terminal, and transmits the read media data to the second communications terminal.

5. A relay method for performing, by using a computer, a relay process for media data being from a data delivery apparatus, the relay method including the steps of:

making a connection with a receiving terminal that is receiving the media data not via the computer;

the computer storing in a data storage a media data processing capacity of a communications terminal other than the connected receiving terminal;

the computer making a transmission request to the data delivery apparatus for the media data corresponding to the media data processing capacity stored in the data storage;

the computer receiving the media data transmitted from the data delivery apparatus in response to the transmission request;

the computer holding the received media data in a buffer;

the computer accepting a terminal switching instruction from the receiving terminal; and the computer acquiring from the data storage the media data processing capacity of the other communications terminal different from the receiving terminal, acquiring from the buffer the media data corresponding to the acquired media data processing capacity, and the computer transferring the acquired media data to the communications terminal, wherein the step of the computer making the transmission request includes making the transmission request for the media data corresponding to a highest performance level of the media data processing capacity of the communications terminal and the receiving terminal.

6. A receiving terminal switching method for switching, such that media data being received by a first communications terminal from a data delivery apparatus not via a relay device is received by a second communications terminal connected to the relay device, the receiving terminal switching method comprising the steps of:

the relay device receiving a connection request from the first communications terminal;

connecting the relay device and the first communications terminal;

the relay device storing a processing capacity of the first communications terminal in a data storage that stores information indicating a processing capacity of a communications terminal that has previously been connected to the relay device;

the relay device making a transmission request to the data delivery apparatus for the media data corresponding to the information stored in the data storage, the transmission request being a request for the media data corresponding to a prescribed processing capacity that is equal to or higher than a highest processing capacity between a processing capacities of a communications terminal and the first communications terminal indicated by the information stored in the data storage;

the relay device receiving the media data, from the data delivery apparatus, in response to the transmission request, and storing the received media data in a buffer;

the relay device reading media data corresponding to a processing capacity of the first communications terminal from media data stored in the buffer, and transmitting the read media data to the first communications terminal;

the relay device receiving an instruction to switch a media data receiving terminal from the first communications terminal to the second communications terminal; and the relay device, upon receiving the switching instruction, reading the media data corresponding to the processing capacity of the second communications terminal from the media data stored in the buffer, and transmitting the read media data to the second communications terminal.

* * * * *